(12) United States Patent
Ademane et al.

(10) Patent No.: US 12,549,115 B2
(45) Date of Patent: Feb. 10, 2026

(54) SYSTEMS, APPARATUSES, AND METHODS TO PERFORM STARTUP STEP DETECTION IN AN INTERNAL PERMANENT MAGNET SYNCHRONOUS MACHINE

(71) Applicant: STMicroelectronics International N.V., Geneva (CH)

(72) Inventors: Harsha Ademane, Chicago, IL (US); Rosario Attanasio, Barrington, IL (US); Dino Costanzo, Catania (IT)

(73) Assignee: STMicroelectronics International N.V., Geneva (CH)

( * ) Notice: Subject to any disclaimer, the term of this patent is extended or adjusted under 35 U.S.C. 154(b) by 213 days.

(21) Appl. No.: 18/375,005

(22) Filed: Sep. 29, 2023

(65) Prior Publication Data

US 2025/0112565 A1 Apr. 3, 2025

(51) Int. Cl.
*H02P 6/20* (2016.01)
*H02P 1/46* (2006.01)
*H02P 6/182* (2016.01)
*H02P 6/185* (2016.01)

(52) U.S. Cl.
CPC .............. *H02P 1/46* (2013.01); *H02P 6/182* (2013.01); *H02P 2207/05* (2013.01)

(58) Field of Classification Search
CPC .... H02P 6/182; H02P 6/20; H02P 1/46; H02P 6/185; H02P 2207/05
USPC ..................................................... 318/400.11
See application file for complete search history.

(56) References Cited

U.S. PATENT DOCUMENTS

| | | | |
|---|---|---|---|
| 4,876,491 A | 10/1989 | Squires et al. | |
| 6,157,150 A * | 12/2000 | Konecny | H02P 6/18 318/400.34 |
| 9,246,420 B2 * | 1/2016 | Hirono | H02P 6/20 |
| 9,325,263 B1 | 4/2016 | Constanzo et al. | |
| 9,525,372 B2 | 12/2016 | Hill | |
| 9,729,099 B1 * | 8/2017 | Lovas | H02P 23/07 |

(Continued)

FOREIGN PATENT DOCUMENTS

CN 107769636 B 11/2019

OTHER PUBLICATIONS

HAN at al., "Initial Rotor Position Detection Method of SPMSM Based on New High Frequency Voltage Injection Method," in IEEE Transactions on Power Electronics, vol. 34, No. 4, pp. 3553-3562, doi: 10.1109/TPEL.2018.2850318, (Apr. 2019).

(Continued)

*Primary Examiner* — Gabriel Agared
(74) *Attorney, Agent, or Firm* — Alston & Bird LLP (57) ABSTRACT

Systems, apparatuses, and methods to perform startup step detection in an internal permanent magnet synchronous machine are provided. Startup step detection may providing a motor comprising a rotor and stator, wherein the rotor may be positioned in one of six rotor step positions. The startup step detection may include determining which of the six rotor step positions the rotor is in. This may be performed by determining, prior to starting the motor, a sequence of voltage signals while taking current measurements for each voltage signal. The current measurements may be a change in current over time. Of the current measurements a largest maximum current measurement may be determined, which may be used to identify the current rotor step position.

20 Claims, 8 Drawing Sheets

700

| STEP | LINE CURRENT | POSITION ⇒ WINDING ⇩ | 1 ADC CURRENT PEAK MEASUREMENT ⇩ | 3 ADC CURRENT PEAK MEASUREMENT ⇩ | 5 ADC CURRENT PEAK MEASUREMENT ⇩ | 2 ADC CURRENT PEAK MEASUREMENT ⇩ | 4 ADC CURRENT PEAK MEASUREMENT ⇩ | 6 ADC CURRENT PEAK MEASUREMENT ⇩ |
|---|---|---|---|---|---|---|---|---|
| 1 | $I_u$ | U-V | HIGHEST | | | | | |
| 3 | $I_v$ | V-W | | HIGHEST | | | | |
| 5 | $I_w$ | W-U | | | HIGHEST | | | |
| 2 | $-I_w$ | U-W | | | | HIGHEST | | |
| 4 | $-I_u$ | V-U | | | | | HIGHEST | |
| 6 | $-I_v$ | W-V | | | | | | HIGHEST |

(56) References Cited

U.S. PATENT DOCUMENTS

| | | | |
|---|---|---|---|
| 10,340,821 B2 | 7/2019 | Magee et al. | |
| 10,897,218 B1 | 1/2021 | Bi et al. | |
| 2004/0052217 A1* | 3/2004 | Anghel | H02P 9/009 |
| | | | 370/254 |
| 2006/0132075 A1* | 6/2006 | Lee | H02P 6/182 |
| | | | 318/400.35 |
| 2010/0026223 A1* | 2/2010 | Liu | H02P 21/32 |
| | | | 318/400.33 |
| 2014/0035502 A1 | 2/2014 | Wang et al. | |
| 2018/0241332 A1* | 8/2018 | Ottewill | H02P 23/14 |
| 2020/0127587 A1* | 4/2020 | Roemmelmayer | H02P 6/26 |
| 2023/0068845 A1* | 3/2023 | Li | H02P 21/32 |

OTHER PUBLICATIONS

Wang et al., Initial Rotor Position Detection for Permanent Magnet Synchronous Motor Based on High-Frequency Voltage Injection without Filter. World Electric Vehicle Journal, 11(4):71. https://doi.org/10.3390/wevj11040071, (Nov. 2020).

Wang et al, "Improved Fast Method of Initial Rotor Position Estimation for Interior Permanent Magnet Synchronous Motor by Symmetric Pulse Voltage Injection," in IEEE Access, vol. 8, pp. 59998-60007, doi: 10.1109/ACCESS.2020.2983106, (2020).

\* cited by examiner

| STEP | LINE CURRENT | POSITION → WINDING → | ADC CURRENT PEAK MEASUREMENT 1 ⇨ | ADC CURRENT PEAK MEASUREMENT 3 ⇨ | ADC CURRENT PEAK MEASUREMENT 5 ⇨ | ADC CURRENT PEAK MEASUREMENT 2 ⇨ | ADC CURRENT PEAK MEASUREMENT 4 ⇨ | ADC CURRENT PEAK MEASUREMENT 6 ⇨ |
|---|---|---|---|---|---|---|---|---|
| 1 | Iu | U-V | HIGHEST | | | | | |
| 3 | Iv | V-W | | HIGHEST | | | | |
| 5 | Iw | W-U | | | HIGHEST | | | |
| 2 | -Iw | U-W | | | | HIGHEST | | |
| 4 | -Iu | V-U | | | | | HIGHEST | |
| 6 | -Iv | W-V | | | | | | HIGHEST |

SYSTEMS, APPARATUSES, AND METHODS TO PERFORM STARTUP STEP DETECTION IN AN INTERNAL PERMANENT MAGNET SYNCHRONOUS MACHINE

TECHNOLOGICAL FIELD

Example embodiments of the present disclosure relate generally to performing startup step detection, including to performing startup step detection in an internal permanent magnet synchronous machines to determine a starting step for a rotor prior to starting the machine.

BACKGROUND

Motors are used in a wide array of applications, including many applications where understanding the position of a rotor before starting the motor allows for providing a controlled amount of torque to a load. If the position of the rotor is unknown then this unknown alignment may result in, among other things, a motor spinning in an incorrect direction, requiring rotor movement during an alignment stage, drawing more current from a battery or power source during an alignment stage, and/or poor startup torque due to initially providing voltage to a motor winding that is not associated with the rotor's current alignment.

There are different types of motors, including a permanent magnet synchronous motors (PMSM). A type of a PMSM used in different applications is an anisotropic interior PMSM (IPMSM). Conventional manners of determining a position of the rotor of an IPMSM may include rotating the rotor, using a Hall-effect sensors, or high frequency injection (HFI) current injected into the motor. Rotating the motor may not be acceptable in applications connected to a load and may also lead to increase time to perform an application. Use of a Hall-effect sensor may increase cost, complexity, and time for methods for determining startup position during an application. Sensorless methods, such as high frequency injection (HFI) and very high frequency injection methods, may include or require additional complexity, circuitry (e.g., highly accurate current sensing, higher processor throughput, etc.), time, and/or costs. Moreover, some such sensorless methods may cause a rotor of the motor to move during startup step detection, which may not be acceptable for many applications.

A new manner of determining the position of the rotor is needed that does not rotate the rotor or include the increased costs of added sensors (e.g., Hall-effect sensor(s)) or increased computational demand of HFI.

The inventors have identified numerous areas of improvement with startup step detection in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to performing startup step detection.

In accordance with some embodiments of the present disclosure, an example method is provided. The method may comprise: providing a permanent magnet brushless motor comprising a rotor and stator, wherein the rotor comprises a plurality of magnets and the stator comprises a plurality of windings, wherein each winding of the plurality of windings is associated with one of a plurality of slots; determining, prior to starting the motor, a startup rotor step position by: applying a first sequence of voltage signals to a plurality of terminals of the motor, wherein the first sequence of voltage signals comprises a plurality of sequence steps, and wherein each sequence step of the sequence steps is associated with a unique combination and order of two terminals of the plurality of terminals; measuring, for each sequence step, a current measurement, wherein each current measurement measures current or a a change in current per time; determining a highest current measurement of the plurality of current measurements, identifying the startup rotor step position of one of six rotor step positions based on the highest current measurement.

In some embodiments, waiting a time period delay between applying each of the voltage signals, wherein the time period delay is configurable.

In some embodiments, applying the first sequence of voltage signals to the plurality of terminals of the motor does not cause the rotor to move.

In some embodiments, each voltage signal of the first sequence of voltage signals has the same duty cycle and duration.

In some embodiments, applying, prior to determining the highest current measurement, at least a second sequence of voltage signals to the plurality of terminals of the motor; and wherein determining the highest current measurement is from the current measurements for each sequence step of at least the first sequence of voltage signals and the second sequence of voltage signals.

In some embodiments, calibrating, prior to determining the startup rotor step position, a maximum duty cycle threshold, wherein the maximum duty cycle threshold is associated with a maximum voltage for the voltage signals of the first sequence of voltage signals.

In some embodiments, the motor is an anisotropic motor.

In accordance with some embodiments of the present disclosure, an example system is provided. The system may comprise: a permanent magnet brushless motor comprising a rotor and stator, wherein the rotor comprises a plurality of magnets and the stator comprises a plurality of windings, wherein each winding of the plurality of windings is associated with one of a plurality of slots; at least one processor and at least one memory coupled to the processor, wherein the processor is configured to determine, prior to starting the motor, a startup rotor step position by being configured to: apply a first sequence of voltage signals to a plurality of terminals of the motor, wherein the first sequence of voltage signals comprises a plurality of sequence steps, and wherein each sequence step of the sequence steps is associated with a unique combination and order of two terminals of the plurality of terminals; measure, for each sequence step, a current measurement, wherein each current measurement measures a current or a change in current per time, determine a highest current measurement of the plurality of current measurements; and identify the startup rotor step position of one of six rotor step positions based on the highest current measurement.

In some embodiments, the processor is configured to: wait a time period delay between applying each of the voltage signals, wherein the time period delay is configurable.

In some embodiments, to apply the first sequence of voltage signals to the plurality of terminals of the motor is configured to not cause the rotor to move.

In some embodiments, each voltage signal of the first sequence of voltage signals has the same duty cycle and duration.

In some embodiments, the processor is configured to: apply, prior to determining the highest current measurement, at least a second sequence of voltage signals to the plurality of terminals of the motor; and wherein to determine the highest current measurement is from the current measurements for each sequence step of at least the first sequence of voltage signals and the second sequence of voltage signals.

In some embodiments, the processor is further configured to: calibrate, prior to determining the startup rotor step position, a maximum duty cycle threshold, wherein the maximum duty cycle threshold is associated with a maximum voltage for the voltage signals of the first sequence of voltage signals.

In some embodiments, the motor is an anisotropic motor.

In accordance with some embodiments of the present disclosure, an example computer program product is provided. The computer program product may comprise at least one non-transitory computer-readable storage medium having computer-readable program code portions stored therein, the computer-readable program code portions comprising an executable portion configured to: determine, prior to starting a permanent magnet brushless motor, a startup rotor step position by: wherein the permanent magnet brushless motor comprises a rotor and stator, wherein the rotor comprises a plurality of magnets and the stator comprises a plurality of windings, wherein each winding of the plurality of windings is associated with one of a plurality of slots; apply a first sequence of voltage signals to a plurality of terminals of the motor, wherein the first sequence of voltage signals comprises a plurality of sequence steps, and wherein each sequence step of the sequence steps is associated with a unique combination and order of two terminals of the plurality of terminals; measure, for each sequence step, a current measurement, wherein each current measurement measures a current or a change in current per time; determine a highest current measurement of the plurality of current measurements; and identify the startup rotor step position of one of six rotor step positions based on the highest current measurement.

In some embodiments, the computer-readable program code portions comprise the executable portion further configured to: waiting a time period delay between applying each of the voltage signals, wherein the time period delay is configurable.

In some embodiments, to apply the first sequence of voltage signals to the plurality of terminals of the motor is configured to not cause the rotor to move.

In some embodiments, each voltage signal of the first sequence of voltage signals has the same duty cycle and duration.

In some embodiments, the computer-readable program code portions comprise the executable portion further configured to: apply, prior to determining the highest current measurement, at least a second sequence of voltage signals to the plurality of terminals of the motor; and wherein to determine the highest current measurement is from the current measurements for each sequence step of at least the first sequence of voltage signals and the second sequence of voltage signals.

In some embodiments, the motor is an anisotropic motor.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Having thus described certain example embodiments of the present disclosure in general terms, reference will now be made to the accompanying drawings, which are not necessarily drawn to scale, and wherein:

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can." "could," "should," "would," "preferably," "possibly," "typically," "optionally," "for example." "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

Overview

Various embodiments of the present disclosure are directed to improved startup step detection, particularly for IPMSMs. It will be readily appreciated that references to a motor or motors herein may be referring to one or more IPMSMs. Various embodiments of the present disclosure may also include other types of motors.

Motors may be used in a myriad of applications. For example, motors may be used in tools that are desired to be lightweight, compact, and efficient. Motors may also be used in drill drivers, blowers, and circular saws as well as for commercial and industrial applications. Embodiments described herein may include and be applicable to all such applications. In such applications it is beneficial to know the position of the motor's rotor prior to starting the motor. For example, operating a three-phase motor at startup benefits by knowing which windings for application of a voltage to when executing startup. This allows for numerous benefits, some of which are described herein.

Various embodiments of the present disclosure may use the anisotropic properties of IPMSMs with buried rotor-magnets to identify a position of a rotor prior to motor startup. The anisotropic properties of IPMSM include the inductance of the rotor varying as a function of rotor position. As described herein, current measurements reflecting this change in inductance may be used to determine a rotor position prior to motor startup. This may be referred to as performing startup step detection as the rotor of the motor may generally rotate between different steps as it rotates.

For example, in an IPMSM as the rotor rotates between 0 and 360 degrees the inductance changes or varies according to the position of the rotor. In various embodiments, a three-phase motor may include three terminals and six steps where each step is associated with a change in 60 electrical degrees. For example, each step may correspond to one of six stable positions the rotor. Measuring currents reflecting the differences in inductance for the different steps with a current measurement allows for determining a current rotor position. A current measurement may be, for example, a measurement of current or the change in current over time (e.g., di/dt). Once the current measurement is measured then the rotor position may be determined based on the maximum current measurement.

The voltage signals applied to allow for the current measurements may have constant duty cycles and constant durations. In other words, the same voltage signal may be applied in one or more sequences to different terminals and/or phases of the motor. For example, a three-phase motor may have three terminals (e.g., U, V, W) and a sequence may apply six voltages to variations of two of the three phases. For example, applying a positive voltage to terminals U and V may be described as U-V. As another example, applying a negative voltage to terminals U and V may be described as UV or V-U. A first sequence starting at step 1 and proceeding to step 6 may be: step 1, step 3, step 5, step 2, step 4, and step 6. Each of the steps may correspond to applying a voltage signal to the terminals in a different order. For example, step 1 may be U-V, step 3 may be V-W, step 5 may be W-U, step 2 may be U-W, step 4 may be V-U, and step 6 may be W-V. The voltages may be PWM signals. Various embodiments may vary use varying sequences, including iterations of a sequence.

The six voltage signals of a sequence may be applied serially in six separate sequence steps. With identical voltage signals being applied, current measurements are taken. The sequence step applying a voltage with the highest current measurement per sequence step/phase corresponds to the least inductance. Keeping time and input duty cycle constant for each step excitation allows for comparing currents per step/phase. Duty cycle and timing for PWM voltage signals may be calibrated to obtain distinguishable currents without moving the rotor.

The startup step detection may determine the starting rotor step prior to starting the motor. Embodiments of the present disclosure avoid rotation of the rotor, either forward or backward, during startup step detection prior to motor starting. This also avoids what may be referred to as a rotor alignment phase that involves the rotation of the rotor to one or more specific positions prior to motor startup. The avoidance of an alignment phase reducing current and/or power draw from a battery or power source.

Embodiments of the present disclosure may allow for multiple improvements, including but not limited to: avoiding rotor movement during startup step detection, reducing power drawn from battery; providing higher starting torque from knowing rotor position prior to applying motor starting current, using anisotropy of I-PMSM motor with buried rotor-magnets to identify the rotor position, and/or lowering processor demand.

This present disclosure may also allow for achieving a high torque from zero speed based on identifying a current position of a rotor and starting the motor based on the identified rotor position. Moreover, various embodiments of the present disclosure may not require an auxiliary sensor to determine rotor position during startup step detection or, in other words, embodiments of the present disclosure may be sensorless. Various embodiments of the present disclosure also allow for reduced complexity of apparatuses and systems by omitting, among other things, sensors, which also reduces the costs and improves form factor and useful life.

Exemplary Systems and Apparatuses

Embodiments of the present disclosure herein include systems and apparatuses for performing startup step detection described herein may be implemented in various embodiments.

Figure 1:
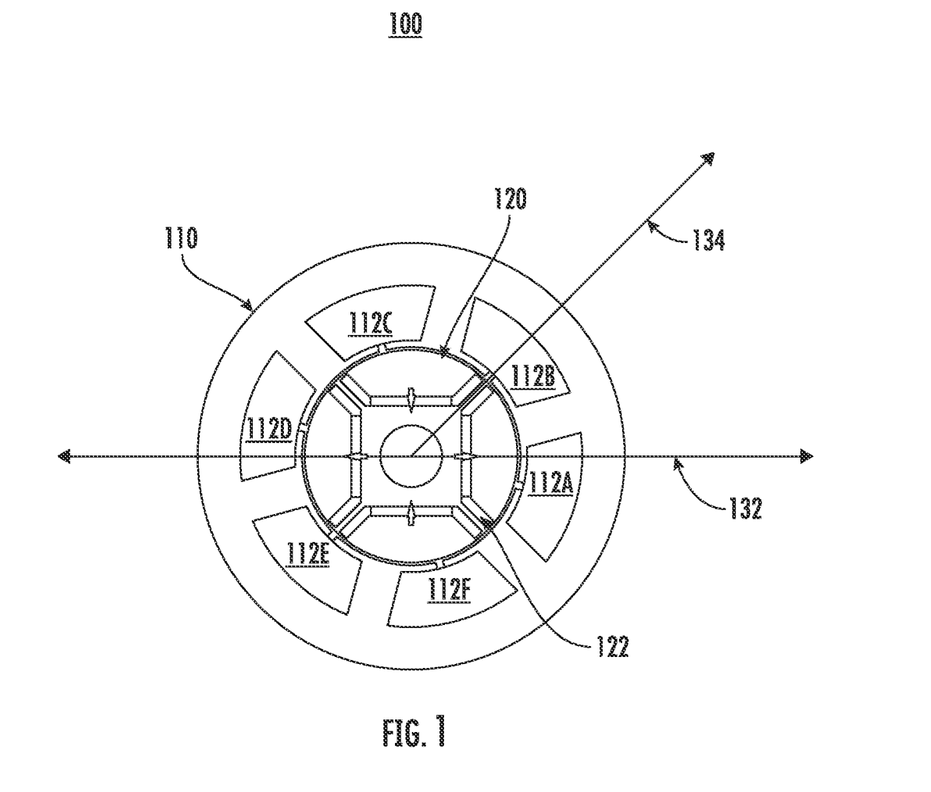
FIG. 1 illustrates an exemplary motor diagram in accordance with one or more embodiments of the present disclosure.

FIG. 1 illustrates an exemplary motor diagram in accordance with one or more embodiments of the present disclosure. FIG. 1 illustrates a cross-section of a motor 100 that includes a stator 110 and a rotor 120. The stator 110 includes a plurality of slots 112. FIG. 1 illustrates six slots 112A-112F. The center of each slots 112A-112F is located 60 degrees from the center of adjacent slots 112. Each of the slots 112 may be an opening in the stator 110. The portions of the rotor 110 between the slots 112 are teeth. Each tooth may be a portion of the stator 110 which windings are wound about. A winding may be wound around each tooth such that a winding wraps into a portion of a first slot (e.g., slot 1) and a portion of a second slot (e.g., slot 2). The windings may be connected to one or more adjacent windings and/or one or more terminals. The rotor 120 includes a plurality of embedded permanent magnets 122.

Two axes are illustrated in FIG. 1, a first axis 132 and a second axis 134. The first axis 132 may be associated with the stator and the second axis 134 may be associated with the rotor The angle between the first axis 132 and the second axis 134 may be referred to as angle θ. As the rotor rotates the angle θ may grow larger or smaller. Determining a startup position may be associated with determining the angle θ. The angle θ may be associated with a mechanical angle θ and an electrical angle θ. The electrical angle θ is equal to the mechanical angle θ multiplied by the pole pairs of the motor. The rotor steps are in electrical degrees associated with electrical angle θ.

The inductance measured from line-to-line may be a function of the position of the rotor. The measured inductance corresponds to the first axis 132 (d-axis inductance) when the rotor is positioned such that the magnetic flux travels through the poles of the magnet in the rotor. The measured inductance corresponds to the second axis 134 (q-axis inductance) when the rotor position is such that the magnetic flux skips and/or by-passes the poles of the magnet in the rotor. In various embodiments the magnetic permeability of the permanent magnets is close to that of air (e.g., Neodymium magnets has a µr=1.05). When the stator flux goes through the magnets, the reluctance is higher leading to a low inductance and a higher current measurement (e.g., di/dt). The d-axis inductance (Ld) may be equal to the minimum measured inductance value adjusted per phase, and the q-axis inductance (Lq) may be equal to the maximum measured inductance value adjusted per phase.

Figure 2A:
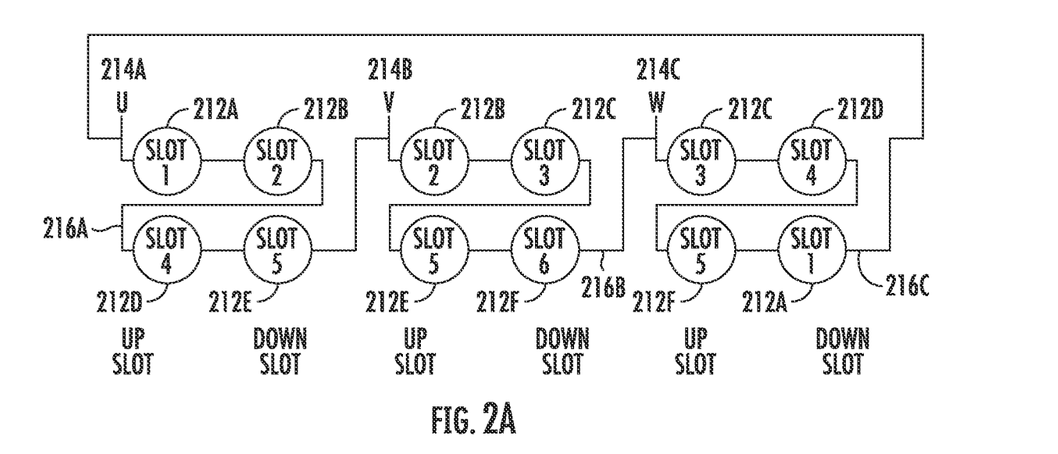
FIG. 2A illustrates a first exemplary winding diagram in accordance with one or more embodiments of the present disclosure.

FIG. 2A illustrates a first exemplary winding diagram in accordance with one or more embodiments of the present disclosure. Motors may include a plurality of terminals to connect the motor to receive a voltage or voltage signal. For example, three phase motors may have three terminals 214. By connecting a voltage signal to combinations of two of these three terminals the voltage signal may cause the rotor of the motor to rotate either in a forward or backward direction. The wiring diagram 200A of FIG. 2A illustrates three electrical connections 216A-C for how three terminals 214A-C referred to as U (214A), V (214B), and W (214C) may be electrically connected. In various embodiments not illustrated the terminals may be referred to with different symbols, such as A-C or 1-3.

As illustrated in FIG. 2A, a first electrical connection 216A may connect a first terminal U (214A) to a second terminal V (214B) by connecting windings through slot 1 (212A), slot 2 (212B), slot 4 (212D), and slot 5 (212E). Thus when a first voltage is applied across terminals U-V (214A-214B) it would provide the first voltage through the windings of slot 1 (212A), slot 2 (212B), slot 4 (212D), and slot 5 (212E). As will be readily appreciated, a second voltage that is the applied from terminal V-U would reverse the electrical connection 216A. In certain embodiments, the electrical connection 216A with this first voltage applied to U-V may be referred to as U and the electrical connection 216A with this second voltage applied from V-U may be referred to as U'. As is readily appreciated, U' is the reverse direction of U.

As also illustrated in FIG. 2A, a second electrical connection 216B may connect a second terminal V (214B) to a third terminal W (214C) by connecting windings through slot 2 (212B), slot 3 (212C), slot 5 (212E), and slot 6 (212F). Thus when a third voltage is applied across terminals V-W (214B-214C) it would provide the third voltage through the windings of slot 2 (212B), slot 3 (212C), slot 5 (212E), and slot 6 (212F). As will be readily appreciated, a fourth voltage that is the applied from terminal W-V would reverse the electrical connection 216B. In certain embodiments, the electrical connection 216B with this third voltage applied to V-W may be referred to as V and the electrical connection 216B with this fourth voltage applied from W-V may be referred to as V'. As is readily appreciated, V' is the reverse direction of V.

As also illustrated in FIG. 2A, a third electrical connection 216C may connect a third terminal W (214C) to a first terminal U (214A) by connecting windings through slot 3 (212C), slot 4 (212D), slot 6 (212F), and slot 1 (212A). Thus when a fifth voltage is applied across terminals W-U (214C-214A) it would provide the fifth voltage through the windings of slot 3 (212C), slot 4 (212D), slot 6 (212F), and slot 1 (212A). As will be readily appreciated, a sixth voltage that is the applied from terminal U-W would reverse the electrical connection 216C. In certain embodiments, the electrical connection 216C with this fifth voltage applied to W-U may be referred to as W and the electrical connection 216C with this sixth voltage applied from U-W may be referred to as W'. As is readily appreciated, W' is the reverse direction of W.

In various embodiments, certain connections may be referred to as up slots or down slots. For example, U-V, V-W, and W-U connections may be referred to as up slots and may cause the application of a current in an up direction in the slot. V-U, W-V, and U-W connections may be referred to as down slots and may cause the application of a current in a down direction in the slot. The direction of the current in an up slot and/or a down slot in relation to the current in other slots may be used to describe the application of current in windings, which is related to the flux generated and how a rotor may spin if sufficient flux is generated from the application of current.

Figure 2B:
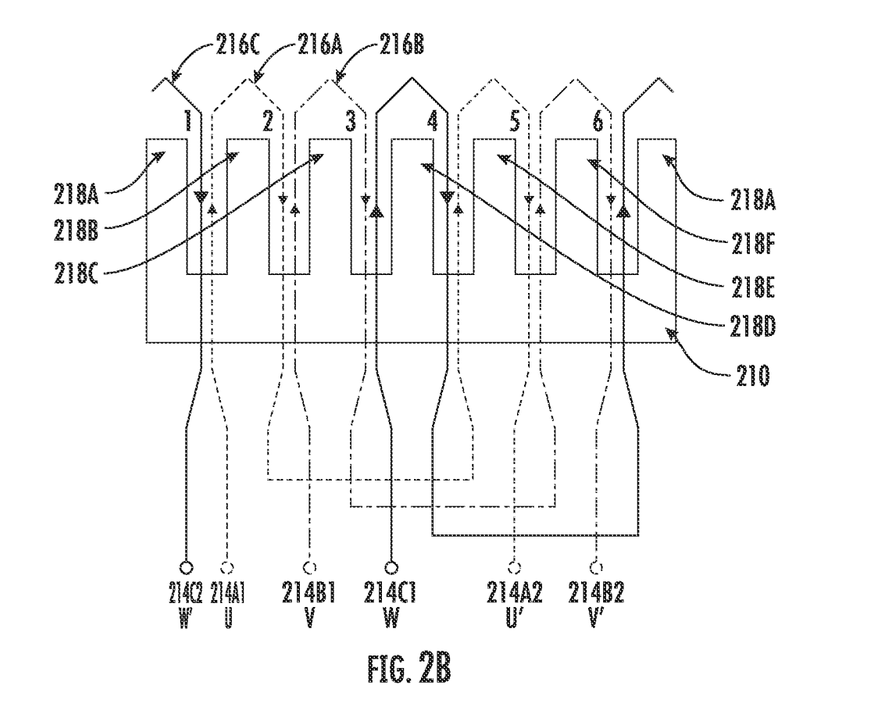
FIG. 2B illustrates a second exemplary winding diagram in accordance with one or more embodiments of the present disclosure.

FIG. 2B illustrates a second exemplary winding diagram in accordance with one or more embodiments of the present disclosure. FIG. 2B illustrates a three-phase motor with stator windings 216. The windings 216 are connected to a terminal and the arrows of windings 216 illustrate a current path for when a positive voltage is applied to a terminal (e.g., U, V, W). It will be appreciated that when a voltage is applied in a reversed direction (e.g., U', V', W') that the current will flow in a reverse direction. FIG. 2B also illustrates teeth 218 of the stator. The windings 216 are wound around the teeth. FIG. 2B also references slots 1 to 6 with: slot 1 between a first tooth 218A and second tooth 218B; slot 2 between a first tooth 218B and second tooth 218C; slot 3 between a first tooth 218C and second tooth 218D; slot 4 between a first tooth 218D and second tooth 218E; slot 5 between a first tooth 218E and second tooth 218F; and slot 6 between a first tooth 218F and second tooth 218A.

In various embodiments of the present disclosure the hardware of a device 300 (e.g., 300A, 300B) may be in one of a plurality of configurations.

Figure 3A:
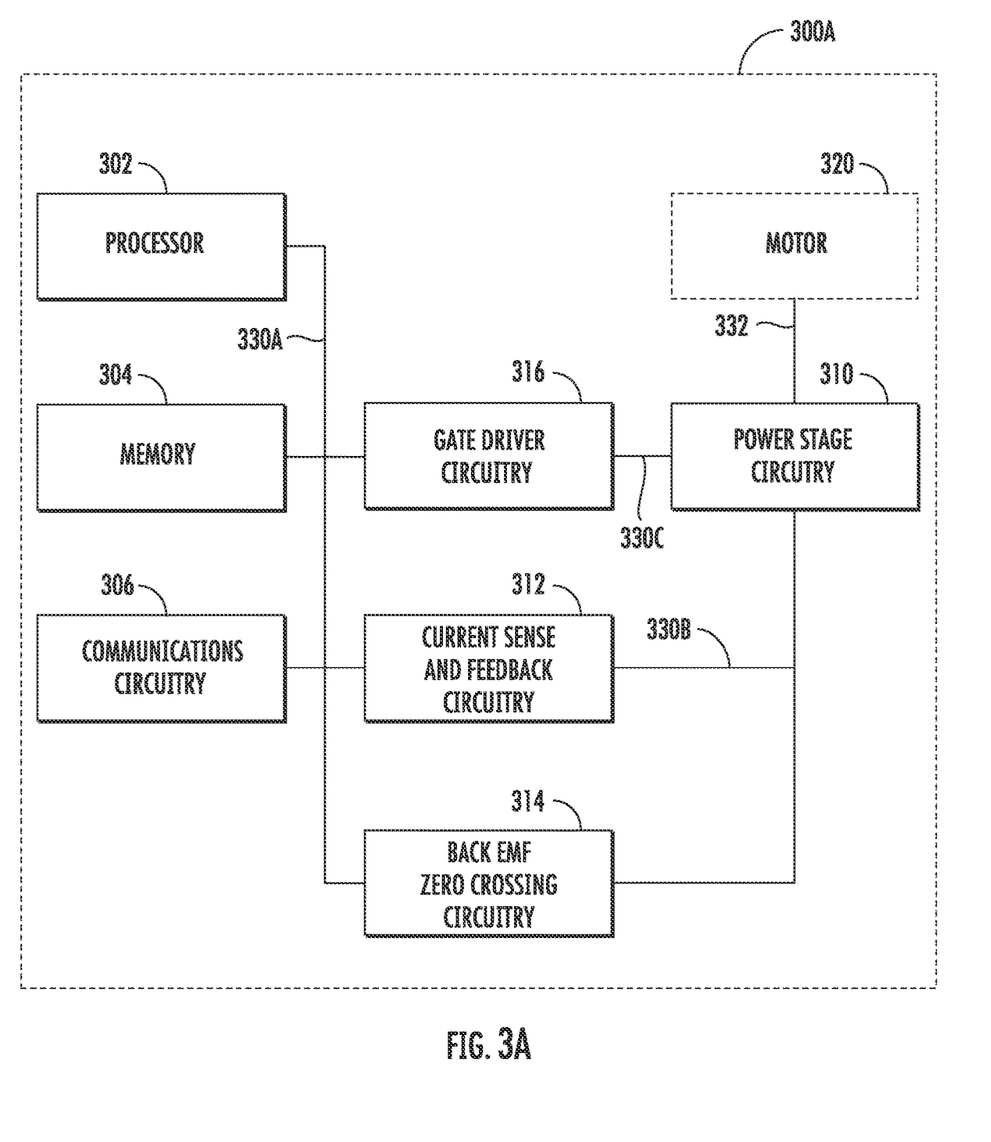
FIG. 3A illustrates a first example block hardware diagram in accordance with one or more embodiments of the present disclosure.

FIG. 3A illustrates a first example block hardware diagram in accordance with one or more embodiments of the present disclosure. The device 300A illustrated may be a system and/or apparatus that includes a processor 302, memory 304, input/output circuitry 306, and a plurality of circuitries, including power stage circuitry 310, current sense feedback circuitry 312 back EMF zero crossing circuitry 314, and gate driver circuitry 316 all of which may be connected. While the connections are illustrated as buses 330A, 330B, and 330C, it will be readily appreciated that there may be multiple other connections. The power stage circuitry may also include a connection to the motor 320, such as with conductors 332. The power stage circuitry 310 may include terminals (e.g., U, V, W) that may be used to provide volage to the motor 320.

The processor 302, although illustrated as a single block, may be comprised of a plurality of components and/or processor circuitry. The processor 302 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits. In various embodiments, the processor 302 may be configured to execute applications, instructions, and/or programs stored in the processor 302, memory 304, or otherwise accessible to the processor 302. When executed by the processor 302, these applications, instructions, and/or programs may enable the execution of one or a plurality of the operations and/or functions described herein. Regardless of whether it is configured by hardware, firmware/software methods, or a combination thereof, the processor 302 may comprise entities capable of executing operations and/or functions according to the embodiments of the present disclosure when correspondingly configured.

The memory 304 may comprise, for example, a volatile memory, a non-volatile memory, or a certain combination thereof. Although illustrated as a single block, the memory 304 may comprise a plurality of memory components. In various embodiments, the memory 304 may comprise, for example, a random access memory, a cache memory, a flash memory, a hard disk, a circuit configured to store information, or a combination thereof. The memory 304 may be configured to write or store data, information, application programs, instructions, etc. so that the processor 302 may execute various operations and/or functions according to the embodiments of the present disclosure. For example, in at least some embodiments, a memory 304 may be configured to buffer or cache data for processing by the processor 302. Additionally or alternatively, in at least some embodiments, the memory 304 may be configured to store program instructions for execution by the processor 302. The memory 304 may store information in the form of static and/or dynamic information. When the operations and/or functions are executed, the stored information may be stored and/or used by the processor 302.

The communication circuitry 306 may be implemented as a circuit, hardware, computer program product, or a combination thereof, which is configured to receive and/or transmit data from/to another component or apparatus. The computer program product may comprise computer-readable program instructions stored on a computer-readable medium (e.g., memory 304) and executed by a processor 302. In various embodiments, the communication circuitry 306 (as with other components discussed herein) may be at least partially implemented as part of the processor 302 or otherwise controlled by the processor 302. The communication circuitry 306 may communicate with the processor 302, for example, through a bus 330. Such a bus 330 may connect to the processor 302, and it may also connect to one or more other components of the processor 302. The communication circuitry 306 may be comprised of, for example, transmitters, receivers, transceivers, network interface cards and/or supporting hardware and/or firmware/software, and may be used for establishing communication with another component(s), apparatus(es), and/or system(s). The communication circuitry 306 may be configured to receive and/or transmit data that may be stored by, for example, the memory 304 by using one or more protocols that can be used for communication between components, apparatuses, and/or systems.

In various embodiments, the communication circuitry 306 may convert, transform, and/or package data into data packets and/or data objects to be transmitted and/or convert, transform, and/or unpackage data received, such as from a first protocol to a second protocol, from a first data type to a second data type, from an analog signal to a digital signal, from a digital signal to an analog signal, or the like.

In various embodiments, the communication circuitry 306 may receive one or more commands for operating and/or starting a motor 320.

Power stage circuitry 310 may operate to apply one or more voltages and/or currents to motor 320. In particular, the power stage circuitry 310 may include a plurality of terminals (e.g., three terminals). One or more terminals may be associated with one of a plurality of phases (e.g., on phase of three phases). The terminals may be connected to the motor 320 by conductors 332. In various embodiments, the conductor 332 may be electrical traces, a three phase cable, or the like. In various embodiments, the power stage circuitry 310 may include a plurality of power semiconductor devices, which may be connected in a 3-phase inverter bridge topology. The power stage circuitry 310 may generate a plurality of signals, such as voltage signals, to be applied to the motor 320 through the conductors 332. The plurality of signals generated by the power stage circuitry 310 may have a duty cycle and/or be generated by pulse width modulation (PWM).

The power stage circuitry 310 may include various components (e.g., resistors, FETS, etc.). In various embodiments, the current that is sensed and/or measured in association with one of the plurality of voltage signals may be sensed and/or measured one or more sense resistors in the power stage circuitry.

The gate driver circuitry 316 may include various components to (e.g., resistors, FETS, amplifiers, etc.). In various embodiments, the gate driver circuitry 316 may be electrically connected to the power stage circuitry 310 with a bus 330C. For example, the gate driver circuitry 316 may be electrically connected to the processor 302 at a first terminal(s) and the power circuitry 310 at a second terminal(s) (e.g., in between the processor 302 and the power circuitry 310). The gate driver circuitry may accept a low-power input and generate a higher current drive input for the power circuitry 310. In various embodiments, In carious embodiments, the gate driver circuitry 316 may be incorporated into the power stage circuitry 310.

The current sense and feedback circuitry 312 may be used to sense current associated with one or more of the plurality of voltages and/or currents provided to the motor 320. In various embodiments, the current sense and feedback circuitry 312 may be electrically connected to the power stage circuitry 310 with a bus 330B. In various embodiments, the current sense feedback circuitry 312 may share one or more components with power stage circuitry 310 and/or other circuitries of the present disclosure. The current sense and feedback circuitry 312 may sense and/or measure a current and send the measured current one or more analog-to-digital converters (ADC) described herein. The ADCs may be used to sense and measure the currents. In various embodiments, the current and sense feedback circuitry 312 may convert a current from an AC current to a DC current, such as by taking an absolute value of measured current. The current and sense feedback circuitry 312 may sense the current and/or voltage and convert it to a voltage value. In various embodiments, this voltage value may include scaling and/or an offset. This voltage value may then be the ADCs.

The back EMF and zero crossing circuitry 314 may be used once the rotor starts spinning and may measure and identify when motor starts and/or stops spinning, including to identify that the rotor has not spun. In various embodiments, the back EMF and zero crossing circuitry 314 may be electrically connected to the power stage circuitry 310 with a bus 330B. The back EMF and zero crossing circuitry 314 may take measurements from the phase windings of the motor connected to the ADCs. Then sensing the value of the back EMF zero crossings may be used to determine a step(s) and then apply one or more sequences. In various embodiments, the back EMF and zero crossing circuitry 314 may be utilized after the rotor acquires sufficient speed for determining a rotor position during startup step detection.

In various embodiments, the device 300 may, or may not, include a motor 320. For example, and while the motor 320 is illustrated in FIG. 3 as included in the device 300, it will be appreciated that the motor 320 may be external to the device 300 and that the conductors 332 may be used to connect to a motor 320 that is external to the device 300. In various embodiments, the device 300 may be a part of a larger system. Alternatively or additionally, the device 300 may be a standalone device.

In various embodiments, the device may be a system-in-package (SIP) that contains, among other things, the processor 302, memory 304, and circuitries of the device.

Figure 3B:
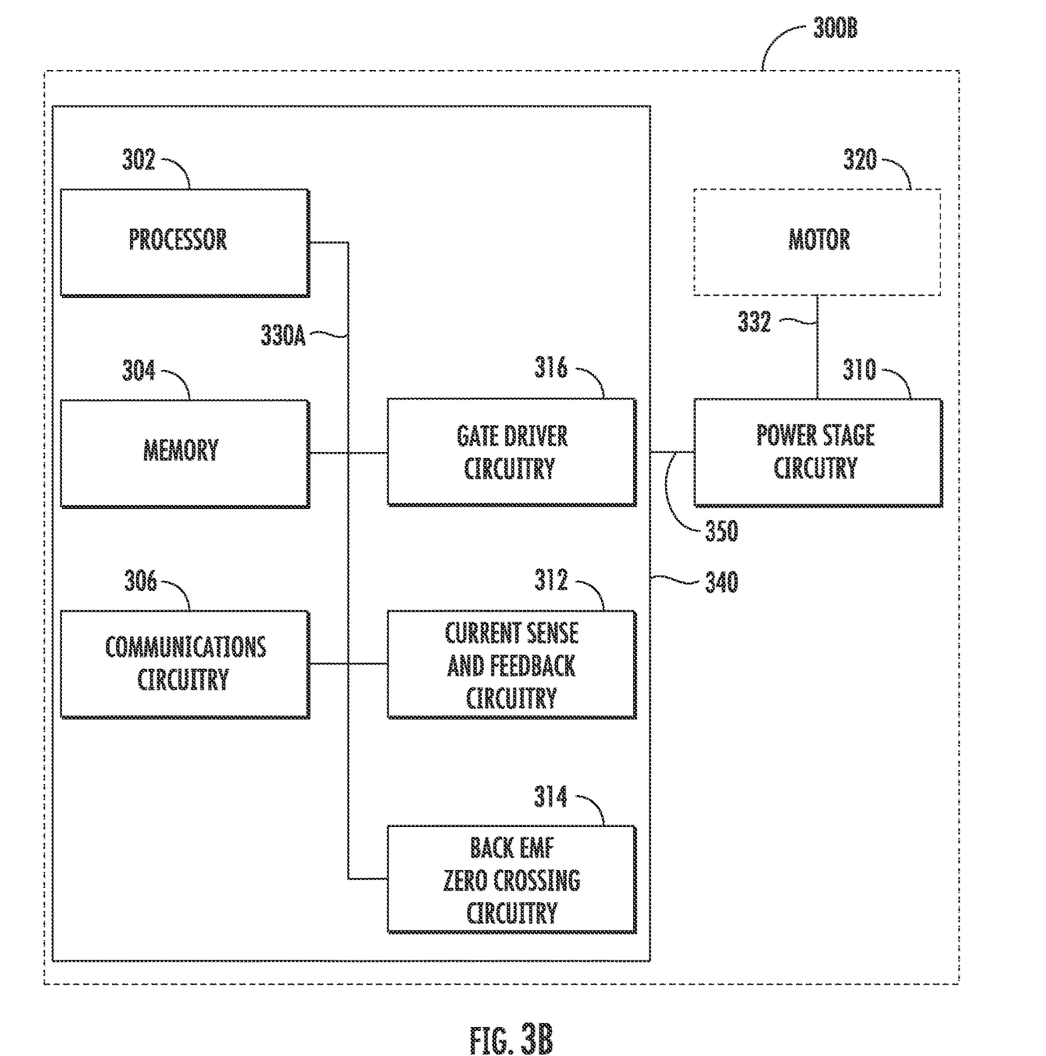
FIG. 3B illustrates a second example block hardware diagram in accordance with one or more embodiments of the present disclosure.

FIG. 3B illustrates a second example block hardware diagram in accordance with one or more embodiments of the present disclosure. The device 300B of FIG. 3B includes the processor 302, memory 304, and one or more circuitries (e.g., 306, 312, 314, and 316) on a package 340. In various embodiments, the package 340 may be a system-in-package. The package 340 may be electrically connected to the power stage circuitry 310 via a bus 350. The bus 350 may include a plurality of electrical terminals and electrical connections between the components and/or circuitries of the package 340 and the power stage circuitry 310. The power stage circuitry may be electrically connected to the motor 320 with conductors 332.

It should be readily appreciated that the embodiments of the systems and apparatuses, described herein may be configured in various additional and alternative manners in addition to those expressly described herein.

Exemplary Methods

Figure 4:
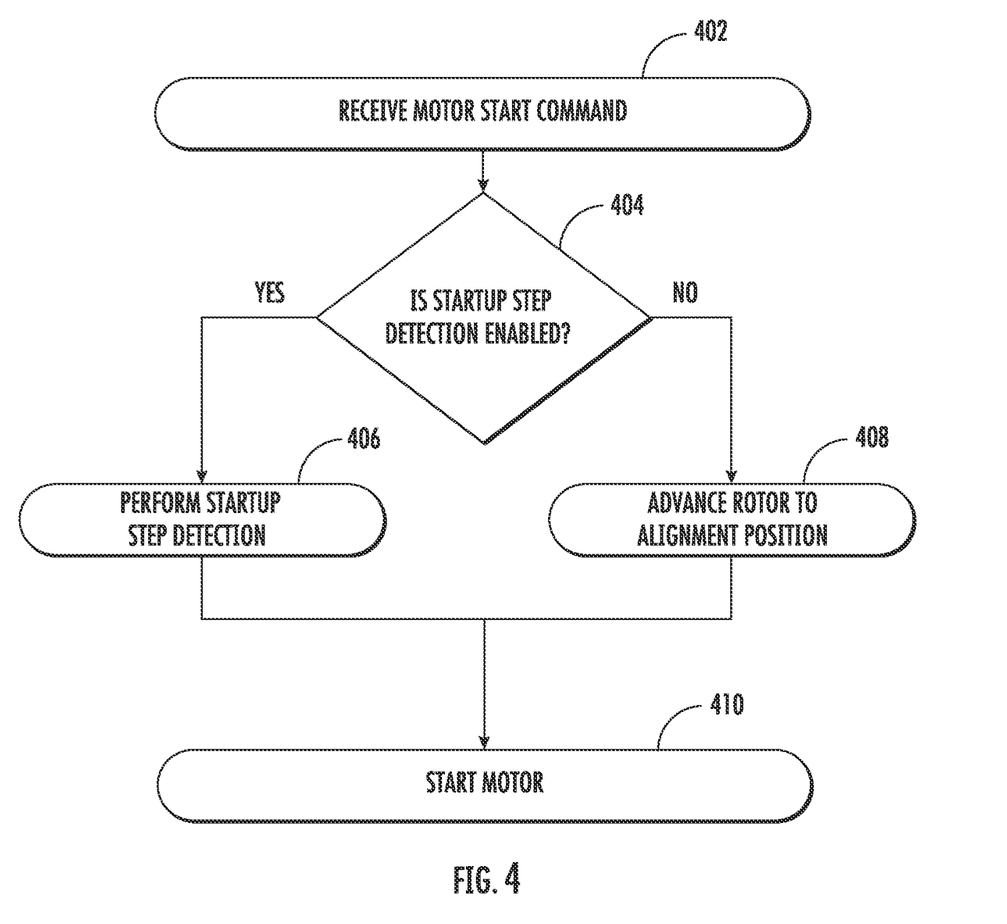
FIG. 4 illustrates a flowchart that includes example operations for starting up a motor in accordance with one or more embodiments of the present disclosure.

FIG. 4 illustrates a flowchart that includes example operations for starting up a motor in accordance with one or more embodiments of the present disclosure.

At operation 402, a motor start command is received. A motor start command may be received externally from a user or a remote system. Alternatively, a motor start command may be generated by a stored program. The motor start command may be provided to and/or executed by a processor 302, which may cause one or more additional operations to be performed as described herein.

Alternatively or additionally, a rotor position command could be received that may cause one or more operations to be performed that would determine the position of a rotor 120 without starting of the motor 100, including the execution of one or more operations of the present disclosure.

At operation 404, it is determined if startup step detection is enabled. If startup step detection is enabled, then may proceed to operation 406. If startup step detection is not enabled, then may proceed to operation 408.

At operation 406, startup step detection is performed. The operations for performance of startup step detection are described herein, including with respect to FIG. 5.

At operation 408, a rotor is advanced to alignment position. As illustrated in FIG. 4, operation 408 may occur after operation 404 if startup step detection is not enabled. The rotor 120 may be advanced to an alignment position. Alternatively, if an alignment position is known, the voltage signals may account for the position of the alignment of the rotor 120 and advanced and/or adjusts one or more sequences of voltage signals to accommodate for the alignment position of the rotor 120.

At operation 410, the motor is started. One or more voltage signals are generated and applied to a motor 100. The one or more voltage signals may be applied through a plurality of terminals in a sequential order so that the motor 100 rotates in a specific direction.

For example, the motor 100 start may include generating a plurality of waveforms to control the motor 100 based at least on the rotor 120 start position. These plurality of waveforms may include a sequence of how they are to be applied to the windings of the motor. The plurality of waveforms may be transmitted to the motor 100, such as through terminals and conductors 332. In various embodiments, the plurality of waveforms may be calibrated for the specific motor 100, which is described herein.

Figure 5:
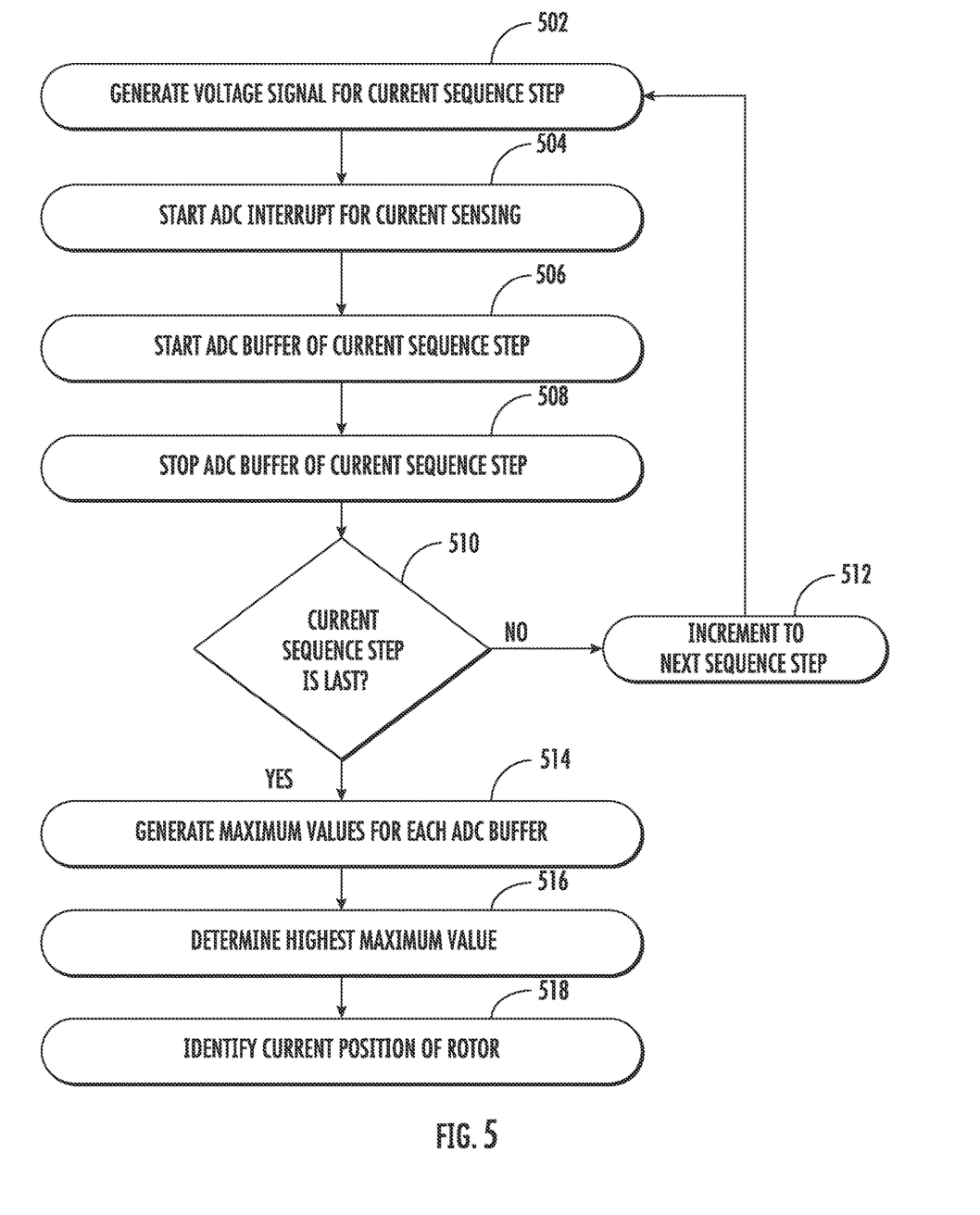
FIG. 5 illustrates a flowchart that includes example operations for performing startup step detection in accordance with one or more embodiments of the present disclosure.

FIG. 5 illustrates a flowchart that includes example operations for performing startup step detection in accordance with one or more embodiments of the present disclosure. The performing of the startup step detection may perform operations for a sequence of voltage signals. The distinct signals for the sequence may be for a sequence step and it may be the sequence steps that are iterated through until the sequence has been completed. In various embodiments, one or more sequences may be iterated.

At operation 502, a voltage signal for the current sequence step is generated. In various embodiments of three phase motors, the voltage signal generated may be applied to a first pair of terminals 214 (e.g., U-W). As operation 502 is iterated through for other sequence steps the pairs of terminals 214 (e.g, U-V) and/or order of terminals 214 in the pair may change (e.g., W-U). The voltage signal is applied to the two terminals 214 so that one or more current measurements may be taken.

At operation 504, an ADC interrupt for current sensing is started. The ADC interrupt for current sensing will cause the ADC to begin sensing and measuring current(s), such as the current across one or more portions of the current sense and feedback circuitry 312.

At operation 506, an ADC buffer of current sequence step is started. The ADC buffer associated with the current sequence step may start recording or storing digital values of the current measured while the associated voltage signal is being applied.

At operation 508, the ADC buffer of current sequence step is stopped. The ADC buffer associated with the current sequence step may stop recording and/or storing digital values.

At operation 510, a determination is made if the current sequence step is the last. If the current sequence step is not the last sequence step in the current sequence, then proceed to operation 512 to iterate additional sequence steps. If the current sequence step is the last sequence step in the current sequence, then proceed to operation 514.

At operation 512, the current sequence step is incremented by one to proceed to the next sequence step in a sequence. In various embodiments, a sequence may be one of six sequence steps and the increment may be to the next sequence step (e.g., from the first sequence step to the second sequence step).

In various embodiments, incrementing to the next step may also include waiting for a time period delay to allow for current in the winding(s) to decay.

At operation 514, maximum values for each ADC buffer are generated. In various embodiments, each sequence step may be associated with its own ADC or, alternatively, one or more sequence steps may share an ADC. To generate the maximum values for each ADC buffer, each ADC buffer may be read for the current measurement(s) stored in the ADC buffer(s).

To measure current an analog to digital converter (ADC) may be used to convert an analog current signal to a digital signal. The digital signal may be provided to a processor 302. The processor 302 may determine current measurement, such as a current or a change in the current per time (e.g., a first derivative of current over time). The highest current measurement (e.g., di/dt) may correspond to the least inductance.

At operation 516, the highest maximum value is determined. Each sequence step may be associated with its own relative maximum value of an associated current measurement. The highest maximum value of these relative maximum values may be determined. The highest maximum value may read out or identified with the associated sequence step. In various embodiments, the determining of the highest maximum value may identify not a maximum value but rather the sequence step associated with the highest maximum value.

In various embodiments, if there is not a highest current measurement (e.g., a tie) or the highest current measurement does not exceed a current measurement threshold, then one or more sequences may be iterated one or more times.

Additionally or alternatively, in various embodiments with multiple iterations of one or more sequences the current respective measurements associated with the iterations may be averaged. For example, a first current measurement for U-W may be averaged with a second current measurement for U-W. The averaged current measurement for each associated sequence step may be used to determine the highest maximum value.

Figure 7:
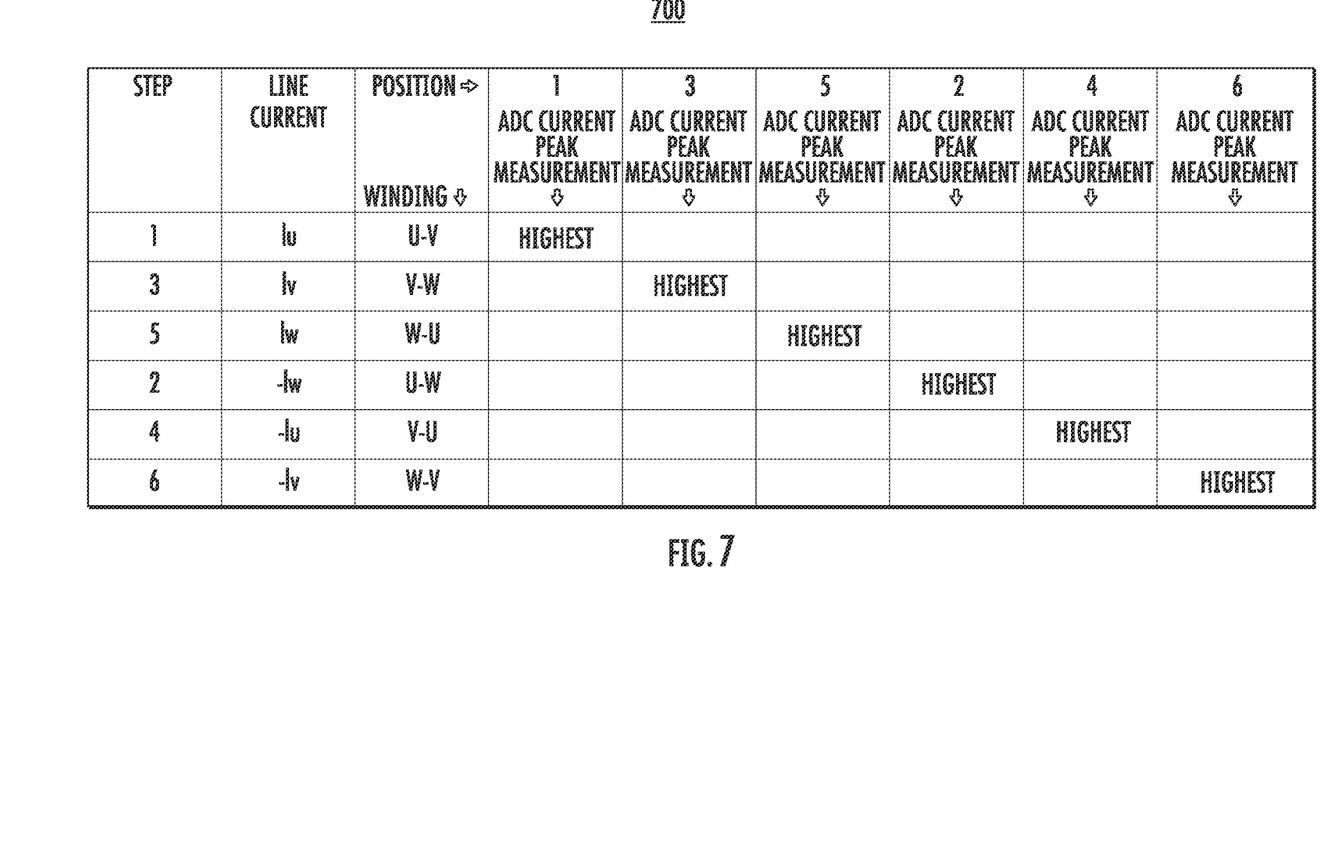
FIG. 7 illustrates an exemplary identification table for one or more operations for performing startup step detection in accordance with one or more embodiments of the present disclosure.

At operation 518, the current position of the rotor is identified. In various embodiments, the processor 302 may query one or more tables, such as a lookup table or an identification table as illustrated in FIG. 7. The table may be used to identify a current rotor step position based on the highest maximum value of a current measurement and/or the associated sequence step. Identifying the current position of the rotor 120 may include identification of one or more windings, one or more terminals, and/or one or more sequence steps. The identification may be subsequently used to identify the windings, terminals, and/or sequencing of steps for applying voltages to start the motor.

In an exemplary embodiment, six voltage signals may be applied in a sequence with six sequence steps. Exemplary voltage signals that may be applied with the following sequence steps are:

Sequence step 1: apply voltage to terminals U-V and a current measurement Iu may be taken, which may be a measurement of the current or a change in current per time;

Sequence step 2: apply voltage to terminals V-W and a current measurement Iv may be taken, which may be a measurement of the current or a change in current per time;

Sequence step 3: apply voltage to terminals W-U and a current measurement Iw may be taken, which may be a measurement of the current or a change in current per time;

Sequence step 4: apply voltage to terminals U-W and a current measurement Iw may be taken, which may be a measurement of the current or a change in current per time;

Sequence step 5: apply voltage to terminals V-U and a current measurement Iu may be taken, which may be a measurement of the current or a change in current per time; and Sequence step 6: apply voltage to terminals W-V and a current measurement Iv make be taken, which may be a measurement of the current or a change in current per time.

Each voltage signal applied may be a pulse with a fixed time (e.g., 1ms) and/or duty cycle (e.g., on for 1ms and off for 1ms). Keeping time and/or duty cycle constant for each sequence step may improve comparing current measurements for each sequence step. In each stable position of the rotor 120 the peak current measurement is a maximum at a sequence step (e.g., U-V, V-W, etc.) that sees the least inductance due to magnetic anisotropy (Ld<Lq) along the rotor.

In various embodiments where a voltage signal may not include a time off, between each pulse may be a delay time period to allow for the current to decay before the application of a subsequent pulse. The time period delay may be adjusted or inserted based on a duty cycle above or below a duty cycle threshold.

In various embodiments, the step detection, including any iterations, may occur in less than 250 milliseconds. For example, various embodiments may determine a rotor position in less than 10 milliseconds. In various embodiments, operations 502-508 may each be performed in one millisecond or less.

In various embodiments, there may also be one or more operations for calibration. These calibration operations may include calibrating a duty cycle of a PWM signal to be generated. The calibration may be performed at a factory or prior to use of the startup step detection.

For example, calibration may be performed to determine a maximum and/or minimum current to be applied that will result in the rotor 120 remaining still (i.e., not rotating). During calibration the voltage signals and/or current signals applied may be slowly ramped or stepped until rotor movement is detected, such as by the back EMF zero crossing circuitry 314. Then the voltage signal and/or current signal that caused the movement may be used as or used for the basis of a threshold to stay under. The ramping or stepping may also be through increasing a duty cycle of a voltage signal or current signal so that a greater amount of voltage and/or current is applied for a given time period. The amount of ramping or stepping may be associated with the resolution of a current measurement, such as by the ADC. The duty cycle may be increased until a maximum duty cycle is determined that may be applied until rotor movement is detected. The maximum duty cycle may be a maximum duty cycle threshold. This maximum duty cycle threshold may be associated with a maximum voltage for the voltage signals that may be applied before causing rotor movement.

In various embodiments, if a motor is changed or if a load connected to a rotor is changed, then the calibration may be rerun.

In various embodiments, the device 300 may include one or more sensors to assist with calibration. For example, a device 300 may include a Hall-sensor that would be used during calibration to assist with identifying calibration settings associated with different rotor positions and/or current measurements. This may include generating, developing, building, or completing an identification table during calibration for use during subsequent startup step detection operations.

In various embodiments, a device 300 may include one or more sensors for determining a position of a rotor 120 (e.g., a Hall-sensor) that may be used when two current measurements are the same or a rotor position may not otherwise be determinable. In such embodiments the use of a position sensor may occur after the sensorless startup step detection has failed to identify a rotor position.

Figure 6:
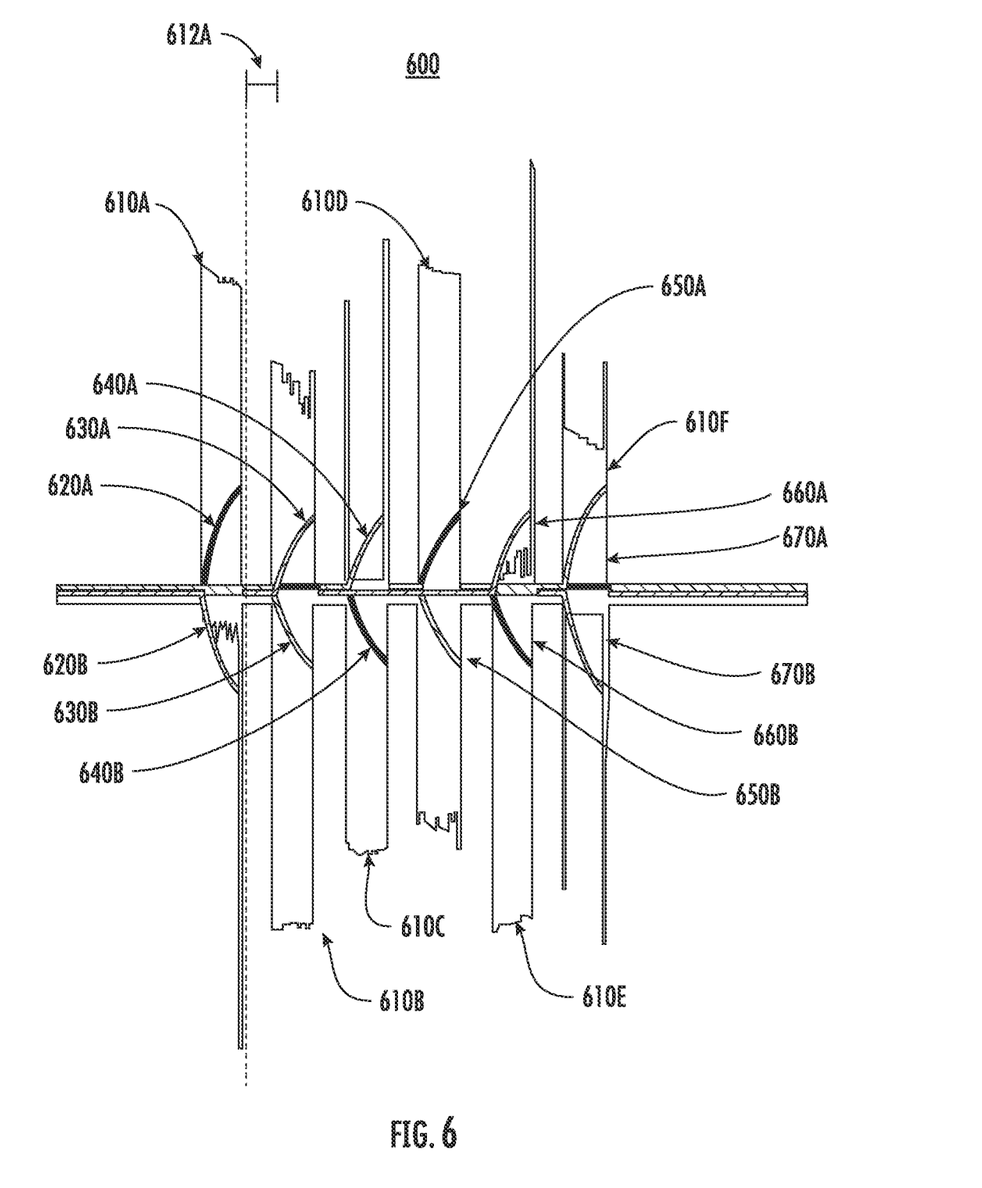
FIG. 6 illustrates an exemplary graph associated with operations for performing startup step detection in accordance with one or more embodiments of the present disclosure.

FIG. 6 illustrates an exemplary graph associated with operations for performing startup step detection in accordance with one or more embodiments of the present disclosure. FIG. 6 illustrates waveforms and current measurements for an exemplary embodiment. In the exemplary embodiment there are six steps and the waveforms 610 are associated with these six steps. As illustrates, voltage signals are applied in a sequence that goes through six steps in an order of step 1, step 3, step 5, step 2, step 4, step 6. This sequence corresponds to voltage applied to terminals U, V, and W in a sequence of: U; V; W; −W; −U; and −V.

The first waveform 610A corresponds to step 1 and is associated with current measurements 620A and 620B. The second waveform 610B corresponds to step 3 and is associated with current measurements 630A and 630B. The third waveform 610C corresponds to step 5 and is associated with current measurements 640A and 640B. The fourth waveform 610D corresponds to step 2 and is associated with current measurements 650A and 650B. The fifth waveform 610E corresponds to step 4 and is associated with current measurements 660A and 660B. The sixth waveform 610F corresponds to step 6 and is associated with current measurements 670A and 670B. Each of the current measurements is associated with a phase current. Each of the current measurements may also be in a positive or negative direction, which may be dependent on how the current may be measured. For example, current measurements 620A, 640B, 650A, and 660B may be associated with a first phase current. Current measurements 620B, 630A, 660A, and 660B may be associated with a second phase current. Current measurements 630B, 640A, 650B and 660A may be associated with a third phase current. Time or time period 612 illustrates a first time period between two of the measurements. The time period 612 may be a time that is waited to allow for a current to decay before applying a subsequent voltage signal.

As illustrated, there are a plurality of steps (e.g., 610A) followed by time period delays (e.g., 612A). The time period delays allow for the current to decay before applying a subsequent voltage. Allowing the current to decay may allow for the next voltage signal in a sequence to be applied without a bias or offset, which may bias a subsequent measurement. The decay time period may be associated with or specific to a motor, such as with an LR time constant of the motor, Rds-on FETS, and/or other such circuitry, or may be specific to a motor and load connected to the motor.

In various embodiments, a time period delay (e.g., 612A) may be calibrated for an application. In some applications there may be no delay or a delay of zero. In various embodiments the time period delay may be configurable, such as based on a calibration, based on a user input, and/or a combination of calibration and user input.

In various embodiments, the operations may compare the current measurements for the current measurement with largest maximum. The largest maximum may be a largest absolute value. As illustrated in FIG. 6, the largest absolute value is associated with the first current measurement, particularly a large negative measurement.

There may also be a delay between a last measurement of a sequence and the starting of a motor. While not shown, it is appreciated that a voltage signal to start the motor may occur after the current from a voltage signal of the sequency has decayed.

In various embodiments, a maximum current may be clearly measured. Additionally or alternatively, a maximum current may be determined by the current associated with a first step being greater than a first threshold than that of the next highest current measurement.

FIG. 7 illustrates an exemplary identification table for one or more operations for performing startup step detection in accordance with one or more embodiments of the present disclosure.

The exemplary identification table of FIG. 7 may represent a lookup table that identifies a single highest current measurement (e.g., di/dt) with an associated step.

For example, a measurement of step 1 with this highest current may be for the rotor to be a position with slot 1. The voltage signal applied for this measurement may across windings between terminals U-V and the current measurement may be referred to as Iu. A measurement of step 3 with this highest current may be for the rotor to be a position with slot 3. The voltage signal applied for this measurement may be across windings between terminals V-W and the current measurement may be referred to as Iv. A measurement of step 5 with this highest current may be for the rotor to be a position with slot 5. The voltage signal applied for this measurement may across windings between terminals W-U and the current measurement may be referred to as Iw. A measurement of step 2 with this highest current may be for the rotor to be a position with slot 2. The voltage signal applied for this measurement may across windings between terminals U-W and the current measurement may be referred to as −Iw. A measurement of step 4 with this highest current may be for the rotor to be a position with slot 4. The voltage signal applied for this measurement may across windings between terminals V-W and the current measurement may be referred to as −Iu. A measurement of step 6 with this highest current may be for the rotor to be a position with slot 6. The voltage signal applied for this measurement may across windings between terminals W-V and the current measurement may be referred to as −Iv.

CONCLUSION

Operations and/or functions of the present disclosure have been described herein, such as in flowcharts. As will be appreciated, computer program instructions or computer program product may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims may cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. A method comprising:
providing a permanent magnet brushless motor comprising a rotor and stator, wherein the rotor comprises a plurality of magnets and the stator comprises a plurality of windings, wherein each winding of the plurality of windings is associated with one of a plurality of slots;
determining, prior to starting the motor, a startup rotor step position by:
applying a first sequence of voltage signals to a plurality of terminals of the motor, wherein the first sequence of voltage signals comprises a plurality of sequence steps, and wherein each sequence step of the sequence steps is associated with a unique combination and order of two terminals of the plurality of terminals;
measuring, for each sequence step, a current measurement, wherein each current measurement measures a current or a change in current per time;
determining a highest current measurement of the plurality of current measurements; and
identifying the startup rotor step position of one of six rotor step positions based on the highest current measurement.

2. The method of claim 1, further comprising:
waiting a time period delay between applying each of the voltage signals, wherein the time period delay is configurable.

3. The method of claim 1, wherein applying the first sequence of voltage signals to the plurality of terminals of the motor does not cause the rotor to move.

4. The method of claim 1, wherein each voltage signal of the first sequence of voltage signals has the same duty cycle and duration.

5. The method of claim 1, further comprising:
applying, prior to determining the highest current measurement, at least a second sequence of voltage signals to the plurality of terminals of the motor; and
wherein determining the highest current measurement is from the current measurements for each sequence step of at least the first sequence of voltage signals and the second sequence of voltage signals.

6. The method of claim 1, further comprising:
calibrating, prior to determining the startup rotor step position, a maximum duty cycle threshold, wherein the maximum duty cycle threshold is associated with a maximum voltage for the voltage signals of the first sequence of voltage signals.

7. The method of claim 1, wherein the motor is an anisotropic motor.

8. A system comprising:
a permanent magnet brushless motor comprising a rotor and stator, wherein the rotor comprises a plurality of magnets and the stator comprises a plurality of windings, wherein each winding of the plurality of windings is associated with one of a plurality of slots;
at least one processor and at least one memory coupled to the processor, wherein the processor is configured to determine, prior to starting the motor, a startup rotor step position by being configured to:
apply a first sequence of voltage signals to a plurality of terminals of the motor, wherein the first sequence of voltage signals comprises a plurality of sequence steps, and wherein each sequence step of the sequence steps is associated with a unique combination and order of two terminals of the plurality of terminals;
measure, for each sequence step, a current measurement, wherein each current measurement measures a current or a change in current per time;
determine a highest current measurement of the plurality of current measurements; and
identify the startup rotor step position of one of six rotor step positions based on the highest current measurement.

9. The system of claim 8, wherein the processor is configured to:
wait a time period delay between applying each of the voltage signals, wherein the time period delay is configurable.

10. The system of claim 8, wherein to apply the first sequence of voltage signals to the plurality of terminals of the motor is configured to not cause the rotor to move.

11. The system of claim 8, wherein each voltage signal of the first sequence of voltage signals has the same duty cycle and duration.

12. The system of claim 8, wherein the processor is configured to:
apply, prior to determining the highest current measurement, at least a second sequence of voltage signals to the plurality of terminals of the motor; and
wherein to determine the highest current measurement is from the current measurements for each sequence step of at least the first sequence of voltage signals and the second sequence of voltage signals.

13. The system of claim 8, wherein the processor is further configured to:
calibrate, prior to determining the startup rotor step position, a maximum duty cycle threshold, wherein the maximum duty cycle threshold is associated with a maximum voltage for the voltage signals of the first sequence of voltage signals.

14. The system of claim 8, wherein the motor is an anisotropic motor.

15. A computer program product comprising at least one non-transitory computer-readable storage medium having computer-readable program code portions stored therein, the computer-readable program code portions comprising an executable portion configured to:
determine, prior to starting a permanent magnet brushless motor, a startup rotor step position by:
wherein the permanent magnet brushless motor comprises a rotor and stator, wherein the rotor comprises a plurality of magnets and the stator comprises a plurality of windings, wherein each winding of the plurality of windings is associated with one of a plurality of slots;
apply a first sequence of voltage signals to a plurality of terminals of the motor, wherein the first sequence of voltage signals comprises a plurality of sequence steps, and wherein each sequence step of the sequence steps is associated with a unique combination and order of two terminals of the plurality of terminals;
measure, for each sequence step, a current measurement, wherein each current measurement measures a current or a change in current per time;
determine a highest current measurement of the plurality of current measurements; and
identify the startup rotor step position of one of six rotor step positions based on the highest current measurement.

16. The computer program product of claim 15, wherein the computer-readable program code portions comprise the executable portion further configured to:
waiting a time period delay between applying each of the voltage signals, wherein the time period delay is configurable.

17. The computer program product of claim 15, wherein to apply the first sequence of voltage signals to the plurality of terminals of the motor is configured to not cause the rotor to move.

18. The computer program product of claim 15, wherein each voltage signal of the first sequence of voltage signals has the same duty cycle and duration.

19. The computer program product of claim 15, wherein the computer-readable program code portions comprise the executable portion further configured to:
apply, prior to determining the highest current measurement, at least a second sequence of voltage signals to the plurality of terminals of the motor; and
wherein to determine the highest current measurement is from the current measurements for each sequence step of at least the first sequence of voltage signals and the second sequence of voltage signals.

20. The computer program product of claim 15, wherein the motor is an anisotropic motor.

* * * * *